United States Patent [19]

Isobe

[11] Patent Number: 4,546,461
[45] Date of Patent: Oct. 8, 1985

[54] METHOD FOR RECORDING INFORMATION ON A RECORDING DISC
[75] Inventor: Teruhiko Isobe, Tokorozawa, Japan
[73] Assignee: Pioneer Video Corporation, Tokyo, Japan
[21] Appl. No.: 446,657
[22] Filed: Dec. 3, 1982
[30] Foreign Application Priority Data
  Dec. 7, 1981 [JP] Japan ................. 56-196633
[51] Int. Cl.[4] .................. G11B 7/00; G11B 19/00
[52] U.S. Cl. ...................... 369/50; 369/59; 369/133; 369/240; 358/342
[58] Field of Search ............... 358/342, 338; 369/50, 369/59, 133, 240
[56] References Cited
U.S. PATENT DOCUMENTS
  4,397,011  8/1983  Ogawa ................. 369/59 X
  4,423,498 12/1983  Kimura ................ 369/50 X Primary Examiner—Robert L. Richardson
Attorney, Agent, or Firm—Fleit, Jacobson, Cohn & Price

[57] ABSTRACT

In order to eliminate a crosstalk component of the reproduction signal and to provide a high level of recording density, a method for recording an information signal having a synchronizing signal on a recording disc comprises a first step for forming a first portion of recording tracks in which information signal is recorded on the recording disc rotated at a constant angular velocity of rotation so that positions of the recording tracks in which the synchronizing signal is recorded are aligned in radial directions of the recording disc, and a second step for forming second portions of recording tracks in which the information signal is recorded on the recording disc under a condition that the angular velocity of the rotation thereof is varying, wherein the first and second portions of the recording tracks are formed alternately.

12 Claims, 8 Drawing Figures

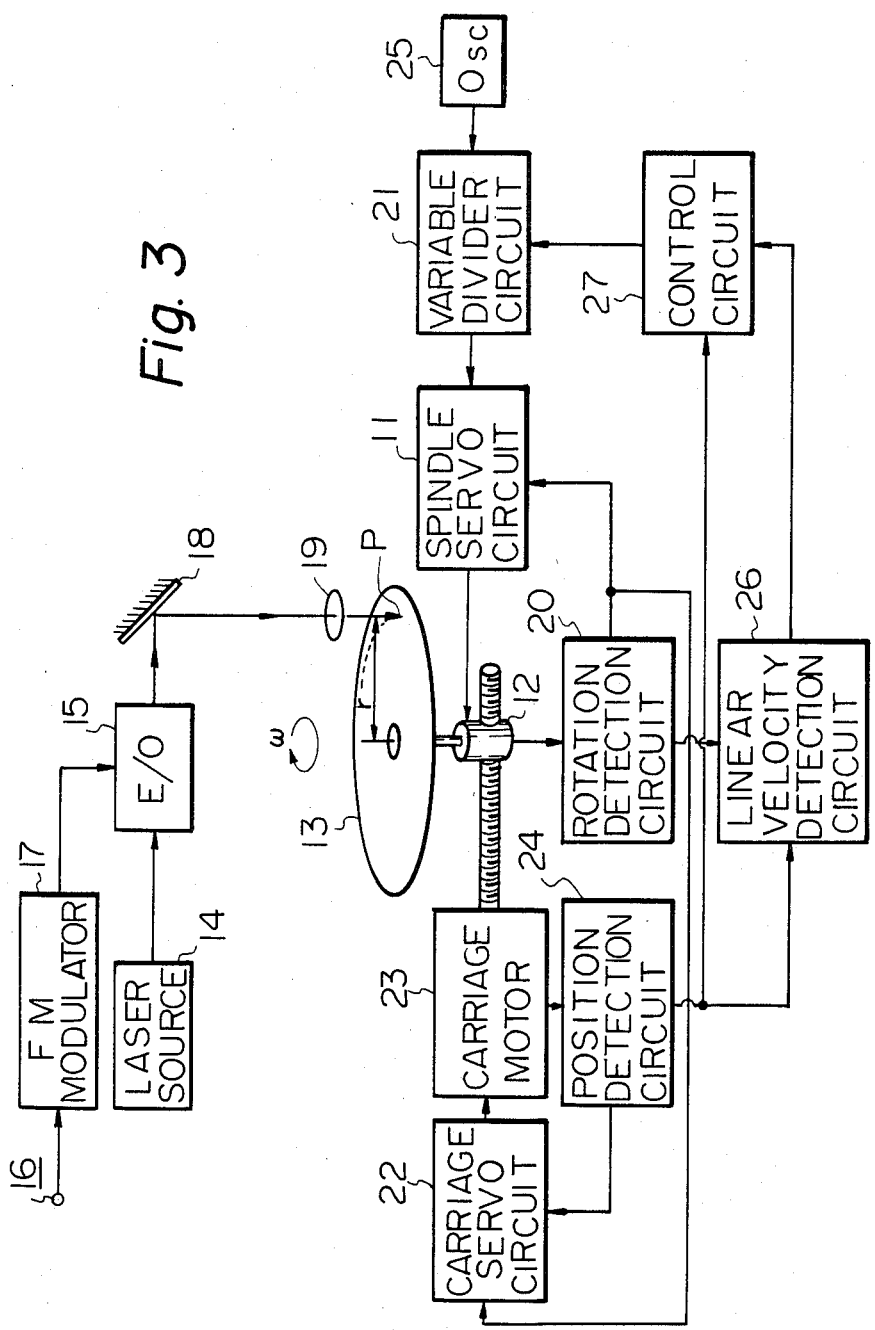

4,546,461

METHOD FOR RECORDING INFORMATION ON A RECORDING DISC

BACKGROUND OF THE INVENTION

1. Field of the Invention

The present invention relates to a method for recording an information signal on a recording disc, and more specifically to a recording method in which an information signal including a synchronizing signal is recorded along a concentric or spiral track formed on the recording disc.

2. Description of the Prior Art

A video disc is used for recording an FM modulation signal of an information signal including a synchronizing signal, such as a video signal. Recording methods for video discs are classified a constant angular velocity (CAV) method and as a constant linear velocity (CLV) method.

In the case of the CAV disc, the positions of recording tracks in which the synchronizing signal is recorded are aligned on the same radius of the disc, and therefore it has an advantage that the phenomenon of crosstalk in which a production signal is disturbed by a synchronizing signal an adjacent recording tracks, is eliminated. However, this type of disc is not suited for a long recording time since the density of recording is low because an unnecessarily long section of recording track is required in the outer side of the recording tracks so as to secure a minimum length of a section between each of the horizontal synchronization signals of the inner recording tracks.

In the case of the CLV disc, on the other hand, the density of recording is high because the length of the portion between each of the horizontal synchronizing signals is made uniform in every recording track. However, the phenomenon of crosstalk can not be eliminated since the position of the recording tracks in which the horizontal synchronizing signals are recorded are not aligned on the same radius of the disc. Therefore, the detected video signal is mixed with a beat component corresponding to the frequency difference of the video signal and the horizontal synchronizing signal, and the picture quality reproduced on a display device is deteriorated by the beat component.

Thus, the CLV disc has the disadvantage of crosstalk in spite of the advantage of the high recording density.

SUMMARY OF THE INVENTION

An object of the present invention is therefore to eliminate the drawbacks of the prior art video discs, and to provide a method for recording information on a recording disc in which high density recording is enabled without deteriorating the crosstalk characteristics, thereby providing a long recording time and improved picture reproduction which is free from the beat component due to the crosstalk phenomenon.

According to the present invention, the method for recording an information signal having a synchronizing signal on a recording disc comprises a first step for forming a first portion of the recording tracks in which the information signal is recorded on the recording disc rotated at a constant angular velocity so that positions of the recording tracks in which the synchronizing signal is recorded are aligned in the radial direction of the disc, and a second step for forming a second portion of the recording tracks in which the information signal is recorded on the recording disc under a condition that the angular velocity of the rotation thereof is varying, wherein the first and second portions of the recording tracks are formed alternately.

BRIEF DESCRIPTION OF THE DRAWINGS

The foregoing and other objects and advantages of the present invention will become more clearly understood upon review of the following description taken in conjunction with the accompanying drawings in which:

FIG. 3 is a block diagram of a recording system for an embodiment of the recording method according to the present invention;

DETAILED DESCRIPTION OF A PREFERRED EMBODIMENT

Figure 1:
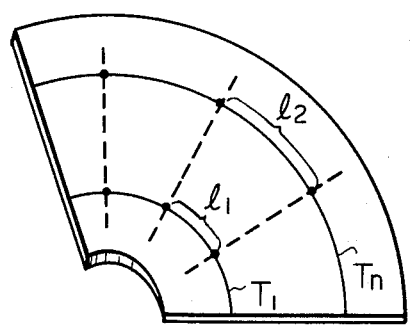
FIG. 1 is a view showing a manner of recording an information signal on a conventional CAV disc.
Figure 2:
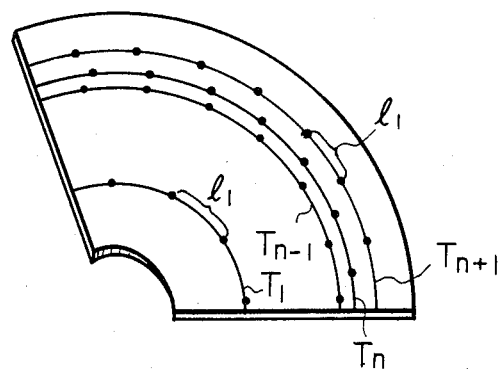
FIG. 2 is a view showing a manner of recording an information signal on a conventional CLV disc.

Before entering into the explanation of an embodiment of the present invention, reference is first made to FIGS. 1 and 2 in which there is shown the manner of recording an information signal including a synchronizing signal on the conventional CAV and CLV discs, respectively.

As shown in FIG. 1, portions (shown by dots) of recording tracks ($T_1$ through $T_n$) on which the synchronizing signal is recorded are aligned on the same radius of the recording disc. In the case of the CAV disc, however, as mentioned before, there is a drawback that the length $l_2$ of the section between the portions for the synchronizing signal on the outer recording track $T_n$ is unnecessarily long due to the necessity of securing a minimum length $l_1$ of the section between each of the synchronizing signals on the inner recording tracks.

In the case of the CLV disc, as shown in FIG. 2, the length $l_1$ of the section of recording track is made constant. However, as mentioned before, in the CLV disc it is difficult to prevent the crosstalk phenomenon since the synchronizing signals recorded at the position shown by the dots are mixed into the signal reproduced from a portion of recording track in which the video signal is recorded.

Therefore, an improved recording method which can eliminate the crosstalk phenomenon and as well as enables a high density recording has been required.

Turning to FIG. 3, an example of recording system for the recording method according to the present invention will be explained.

As shown, this system takes the form of an optical recording system and comprises a spindle motor 12 for rotating a recording disc 13, which is controlled by an output signal of a spindle servo circuit 11. A surface of the recording disc 13 is covered by a photo-sensitive layer made of a photo-resist material, for example, and is adapted to be exposed to a light beam from a laser source 14.

The light beam from the laser source 14 is controlled on and off by means of an electro-optical (E/O) converter 15 in accordance with an output signal of an FM modulator 17 which receives an information signal at an input terminal 16 thereof. The thus on/off modulated laser beam is then focused on the surface of the recording disc via a fixed mirror 18 and a focus lens 19.

The rotation of the recording disc 13 is detected by a rotation detection circuit 20, which comprises a rotary encoder for example, and a control signal for the spindle motor 12 is produced in the spindle servo circuit 11 by comparing the frequency and the phase of an output signal of the rotation detection circuit 20 with those of an output signal of a variable divider circuit 21 which will be described later.

In order to determine the position of the recording disc 13 relative to the position of the recording laser beam through the focus lens, a carriage motor 23 which is controlled by a carriage servo circuit 22 is provided to move the spindle motor 12 along an axis in the radial direction of the recording disc 13. The relative position of the recording disc 13 is detected by a position detection circuit 24, which comprises a linear encoder for example, and an output signal of the position detection circuit 24 is fed back to the carriage servo circuit 22 and is also applied to a linear velocity detection circuit 26 and a control circuit 27, which will be explained later. The carriage servo circuit 22 also receives the output signal of the rotation detection circuit so that the speed of the carriage motor 23 is controlled to form the recording tracks having a proper pitch in accordance with the rotation of the recording disc 13.

In the spindle servo circuit 11, a control signal for the spindle motor 12 is produced by comparing the frequency and the phase of the output signal of the rotation detection circuit 20 with those of a signal from an oscillation circuit 25 divided by a variable divider circuit 21 comprising a variable counter, for example, at a predetermined dividing ratio. The dividing ratio n is varied in accordance with a control circuit 27 which receives a linear velocity signal produced in the linear velocity detection circuit 26 from output signals of position detection circuit 24 and the rotation detection circuit 20.

More specifically, in the linear velocity detection circuit, a linear velocity $v$ is calculated from an angular velocity $\omega$ of the rotation of the recording disc detected by the rotation detection circuit 20 and the distance Y from a center of rotation of the recording disc 13 to a point P of the recording in accordance with an equation $v = Y\omega$. Then the dividing ratio n is gradually varied so that the linear velocity $v$ is in a predetermined range. Furthermore, the output signal of the position detection circuit 24 is also applied to the control circuit 27 since the dividing ratio n is varied only when the recording disc is moved in preferred positions of the range of the linear movement of the recording disc 13.

Figures 4A, 4B, 4C, 4D:
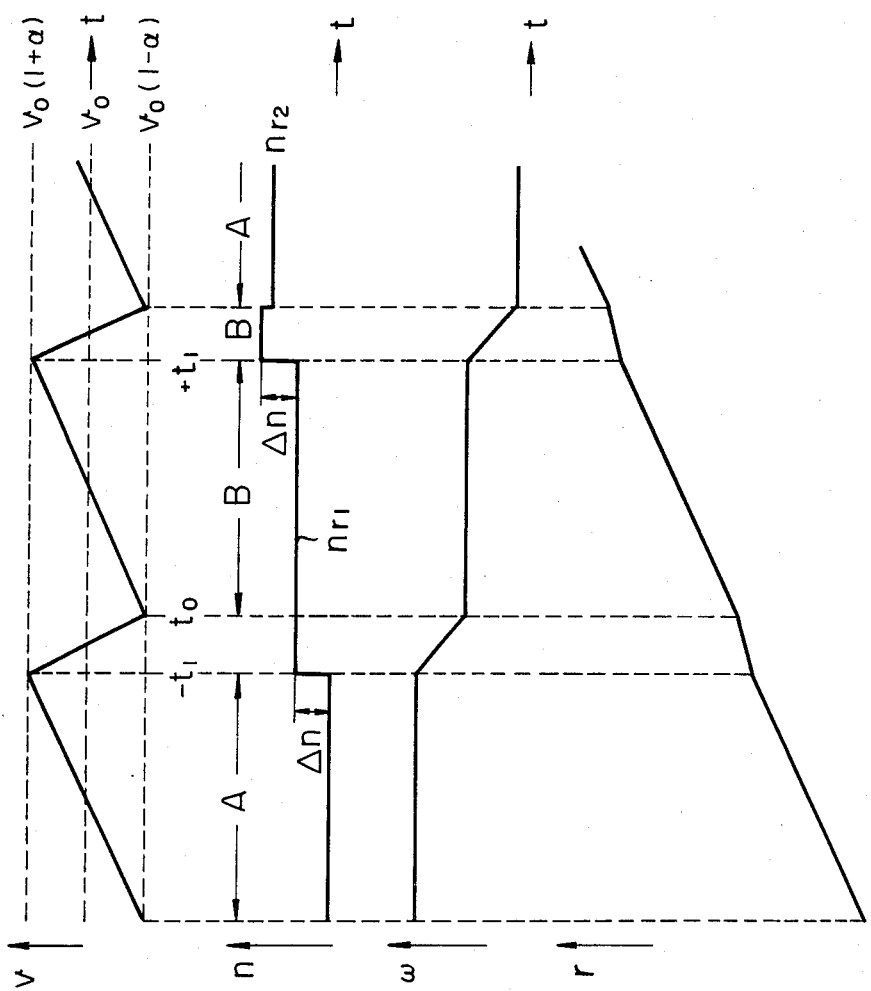
FIG. 4 is a timing chart showing the operation of the recording system shown in FIG. 3.

The operation of the system shown in FIG. 3 will be explained with reference to FIGS. 4A through 4D. FIG. 4A shows the variation of linear velocity $v$ of the recording track when the recording is executed from the inner side of the recording track to the outer side of the recording disc. FIG. 4B shows the variation of the dividing ratio of the dividing circuit 21. FIG. 4C shows the angular velocity of the recording disc. FIG. 4D shows the distance Y of the recording point from the center of the recording disc 13. As shown, the dividing ratio n is maintained constant in a first portion A of the recording tracks and the angular velocity of the rotation of the disc is maintained constant. Thus, the recording disc is rotated in the manner of the constant angular velocity (CAV) operation. During this period, the carriage motor 23 is driven in accordance with the rotation of the spindle motor 12 in a manner that the linear velocity increases with the increase of the distance.

When the linear velocity reaches a predetermined maximum value $v_0(1+\alpha)$, the control circuit 27 controls the dividing circuit 21 to increase the dividing ratio n to a value $n+\Delta\eta$. In accordance with this operation, the frequency of the output signal of the dividing circuit 21 decreases, and the spindle servo circuit 11 is set in an unlocked state.

In this unlocked state, as shown by a portion B of the FIGS. 4A through 4D, the spindle servo circuit reduces the angular velocity of the rotation of the recording disc in accordance with a predetermined characteristic, such as a constant acceleration (CAA) operation in which the ratio of decrease of the angular velocity is constant.

In order to realize constant angular acceleration operation, a signal may, for example, be produced in the spindle servo circuit 11 which causes a braking effect on the drive signal of the spindle motor 12 to reduce the speed of the spindle motor 12. Otherwise, a so called free running operation of the open state of the spindle servo system may be used to decrease the speed of the spindle motor 12.

Needless to say the driving operation of the portion B is not limited to the CAA operation, and any kind of operation may be used in which the linear velocity of the recording track is decreased in a manner as shown in FIG. 4A.

When the rotation speed decreases to a predetermined minimum value $v_0(1-\alpha)$, the driving operation is switched again to the CAV operation. Since the position of the recording tracks in which the synchronizing signal is recorded must be aligned on the same radial direction of the disc in order to reduce the crosstalk effect, the position for effecting this switching operation to the CAV operation is limited to a predetermined appropriate radial position of the disc 13.

In other words, in order to align the positions for recording the synchronizing signal, the radius of the recording track at which the recording operation is to be switched to the CAV operation has to be a value which satisfies the following equation:

$$Y_\eta = mS/2\pi \qquad (1)$$

in which S is a length t of recording track corresponding to the interval of the horizontal synchronizing signal, and m is a integral number.

This is because the circumferential length t of recording track must be a multiple of the length S of recording track corresponding to the interval of the horizontal synchronizing signals.

Assuming that the positions at which the synchronizing signals are recorded are aligned in radial direction of disc on the innermost recording track and the recording tracks adjacent thereto, the length S is given as follows:

$$S = 2\pi r_0 \cdot f_1 / f_2 \qquad (2)$$

in which $r_0$ is the radius of the innermost recording track, $f_1$ is the frequency of the rotation of the disc at that point, $f_2$ is the frequency of the synchronizing signal.

Therefore, the radius $r_n$ at which the recording speed control is switched to the CAV operation is calculated from the equations (1) and (2), as follows:

$$r_n = mr_0 \cdot f_1/f_2 \qquad (3)$$

This value of $r_n$ is previously memorized or calculated in the control circuit 27, and the switching to the CAV operation is effected when the linear velocity $v$ becomes close to the value $v_0(1-\alpha)$ and the radius $r$ of the recording track satisfies the equation (3). At that moment, the control circuit 27 produces a control signal which sets the dividing ratio $r$ to a value $(n_r)$ corresponding to the radial position $r_n$ calculated by the equation (3). The spindle servo system therefore, operates so that it is locked to the output signal of the dividing circuit 21 and the disc is rotated at a constant angular velocity. The control circuit 27 comprises a microprocessor having a memory device for example.

Figure 5:
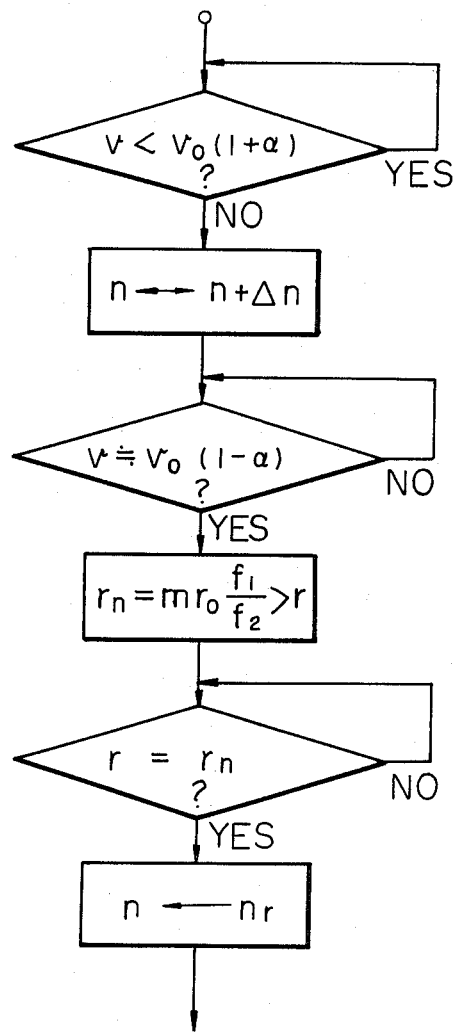
FIG. 5 is a flowchart showing the operation of the recording system shown in FIG. 3.

Referring to FIG. 5, the operational process in the control circuit 27 will be explained hereinafter;

As shown in FIG. 5, the control circuit 27 monitors the linear velocity of the recording by means of the output signal of a linear velocity detection circuit.

The circuit 27 does not operate until the linear velocity reaches the upper limit $v_0(1+\alpha)$. When the linear velocity reaches the upper limit $v_0(1+\alpha)$, the dividing ratio n of the dividing circuit 21 is raised by the amount $\Delta n$. With this change of the output signal of the dividing circuit 21, the spindle servo circuit 11 which receives this output signal as a basic signal thereof, is controlled to be out of the locked state thereof. Accordingly, the speed of the spindle motor reduces in accordance with the characteristic determined by the spindle servo circuit 11. This reduction of the speed of the spindle motor 12 is detected as a decrease of the linear velocity.

On the other hand, when the linear velocity becomes close to the value $v_0(1-\alpha)$ which has a predetermined range, the control circuit 27 calculates the value of the radius $r_n$ which is memorized in the memory device, and is closest to the radius value of that time. When the actual radius reaches this value, the control circuit 27 sets the dividing ratio of the dividing circuit 21 to predetermined values $n_r$ ($n_{r1}$, $n_{r2}$ and so on), thus the positions of the recording tracks in which the synchronizing signal is recorded are aligned on the same radial directions of the recording disc between adjacent recording tracks around the radius of $r_n$.

In addition, in FIG. 4B, the dividing ratio before and after the time $t_0$ has a constant value $n+\Delta\eta=n_{r1}$, this is due to the assumption that the initial value $n+\Delta\eta$ of the dividing ratio is accidentally equal to the dividing ratio corresponding to the radius $r_n$ at the time $t_0$.

In this way, the largest part of the recording operation can be effected as the CAV method. Thus, the positions of the recording tracks in which the synchronizing signal is recorded are aligned on the same radius of the recording disc, and the crosstalk phenomenon is eliminated. Furthermore, since the angular velocity of the rotation of the disc is gradually decreased by stages at the position between each portion of recording tracks in which the recording of the signal is effected in accordance with the CAV method, the total density of recording is remarkably increased relative to the conventional CAV disc.

Even though the crosstalk effect is present in the portion of the recording tracks in which the recording is executed under the condition of varying angular velocity of the rotation of the disc, the time duration in which the crosstalk is present can be minimized by properly adjusting the speed of the change of the angular velocity of the rotation of the disc and the disturbance in the reproduced picture can be minimized by reducing the time in which the beat disturbance is present in the picture.

The operation of the system during this transitional period from the CAA operation to the CAV operation will be mathmatically explained with reference to FIG. 4.

Assuming that the radius of the recording track at the time $-t_1$ of the beginning of the CAA operation is $r_{n-1}$, and that the number of the scanning lines in a recording track is m, and the frequency and the linear velocity of the rotation of the disc at that time are respectively $f_{n-1}$ and $v_0(1+\alpha)$, the following equation is given:

$$f_{n-1} = 15{,}750/m = v_0(1+\alpha)/2\pi r_{n-1} \qquad (4)$$

in which 15,750 is the frequency of the horizontal synchronizing signal.

Similarly, assuming that the frequency of rotation at the time $t=t_0$ is $f_n$, and the number of scanning lines is $m'$, and the radius of the recording track is $r_n$, the following equation can be derived:

$$f_n \approx 15{,}750/m \approx v_0(1-\alpha)/2\pi r_n \qquad (5)$$

If the time duration $-t_1$ through $t_0$ is sufficiently short, the $r_n$ is substantially equal to $r_{n-1}$. Therefore, equation (5) can be rewritten as follows:

$$f_n \approx v_0(1-\alpha)/2\pi r_{n-1} \qquad (6)$$

By the equations (4) and (6), $$m'/m(1+\alpha)/(1-\alpha) \approx 1 + 2\alpha/(1-\alpha) \qquad (7)$$

Therefore the following equation is obtained:

$$m' \approx m(1+2\alpha)$$

Then the time duration of the CAA operation, that is, the time duration in which the crosstalk disturbance is present in the picture, is calculated as follows:

$$\omega = \omega_n - at \qquad (9)$$

in which the constant accelerating speed during this period is designated by a, and therefore:

$$f_{n-1} = f_n + (a/2\pi)T_B \qquad (10)$$

Accordingly, the time duration $T_B$ is calculated as follows:

$$\begin{aligned} T_B &= (f_{n-1} - f_n)/(a/2\pi) \\ &= \{(15{,}750/m) - (15{,}750/m')/(a/2\pi) \\ &= \{15{,}750/(a/2\pi)\} \cdot (2\alpha/m) \end{aligned} \qquad (11)$$

In addition, the equation (8) is utilized for calculating the equation (11). The number of times of presence of the crosstalk signal in the picture is $m'-m \approx 2$ dm (by the equation (8)), and the crosstalk disturbances are present during the time period shown by the equation (11).

The time duration of the CAV operation, that is, the time duration in which no crosstalk disturbance is present in the picture, is calculated as follows:

$$T_A = (r_{n+1} - r_n)/P \cdot f_n \qquad (12)$$

in which the radius of the recording track is $r_{n+1}$ at the time $+t_1$ in which the linear velocity of the recording track reaches the value $v_o(1+\alpha)$, and P is the track pitch.

The equation is further modified as follows:

$$T_A \approx \{r_o(1+\alpha) - r_o(1-\alpha)\}/2\pi f_{n2} \cdot P$$
$$= 2\alpha \cdot r_o/2\pi f_{n2} \cdot P$$
$$= 2\alpha f_o r_o/f_{n2} \cdot P$$
$$= 2\alpha(m')^2 f_o r_o/(15,750)^2 \cdot P$$

in which $r_0$ and $f_0$ are the radius of the innermost recording track and the frequency of rotation thereof, respectively.

As an example, if $\alpha=0.5\%$, $a=0.2$ (rad)/sec$^2$, P=1.5 µm, $f_0=30$ Hz, and $r_0=55$ m/m, $T_B=2.8$ sec, $T_A=14.7$ sec, $m'-m=6$ (m=570) for the innermost recording track (r−60 m/m), $T_B=1.7$ sec, $T_A=40.9$ sec, $m'-m=10$ (m=950) for the intermediate recording track (r=100 m/m) and $T_B=1.2$ sec, $T_A=80.0$ sec, $m'-m=13$ (m=13,30) for the outer recording track (r=140 m/m).

It will be readily appreciated from the foregoing, according to the present invention, that the crosstalk component is minimized by aligning the positions for recording the synchronizing signals, and therefore the effect of the crosstalk component on the reproduced picture is substantially negligible. Furthermore, if the information signal is the horizontal synchronizing signal, the beat disturbance due to the crosstalk component will be limited in the fly-back line of the scanning lines, and therefore, reproduced video signal is no larger disturbed by the crosstalk component.

Moreover, since the linear velocity of the recording track is controlled within a range $v_o(1+\alpha)$ through $v_o(1-\alpha)$, the density of the recording is improved, especially at the outer side of the recording tracks, and therefore a long recording time is possible.

A preferred embodiment of the present invention has been described above. It should be understood, however, that the foregoing description is for illustrative purposes only, and is not intended to limit the scope of the invention. Rather, there are numerous equivalents to the preferred embodiments, and such are intended to be covered by the appended claims.

As an example, the invention is applicable to a recording system in which the recording is initiated from the outer side of the recording tracks, or to a system in which a recording means other than a laser beam is utilized. Furthermore, the invention is applicable to a recording system which is adapted to record an information signal other than a video signal, as far as the recording track is made as a spiral or a concentrical form. In addition, the method for reducing the angular velocity of rotation is not limited to the CAA operation which is described in the explanation of the preferred embodiment, and further CLV operation in which the linear velocity of the rotation is constant may be used as this method for reducing the angular velocity of the rotation. Moreover, either CAA operation or CAV operation may take place first. Furthermore, mode of operations may be changed at one or more desired number of times.

What is claimed is:

1. A method for recording on a recording disc an information signal having a synchronizing signal, said method comprising:

forming a first type portion of recording tracks within a circular zone of the recording disc in which the information signal is recorded on the recording disc while the disc is rotated at a constant angular velocity of rotation so that corresponding positions of the recording tracks in which the synchronizing signal is recorded are aligned in a radial direction of the recording disc;

forming a second type portion of recording tracks within another circular zone of the recording disc in which the information signal is recorded on the recording disc under a condition that the angular velocity of the rotation of the disc is varying;

alternately effecting said first and second recording tracks across a plurality of circular zones on the recording disc; and determining values for said constant angular velocity of rotation for said step of forming a first type portion of recording tracks in such a manner that the constant angular velocity of rotation for a circular zone located radially outwardly of a first circular zone in which said first type portion of recording tracks are formed is smaller than the constant angular velocity of rotation for said first circular zone.

2. A method as claimed in claim 1, wherein said second type portion of recording tracks in which the information signal is recorded in the recording disc is formed while the disc is rotated at a constant angular acceleration.

3. A method as claimed in claim 1, wherein the linear velocity that corresponds with the angular velocity at any point of the recording tracks that are formed in said first type portion is limited so that it does not exceed a predetermined value.

4. A method as claimed in claim 1 wherein said information signal is a video format signal and said synchronizing signal is a horizontal synchronizing signal.

5. A method as claimed in claim 3 wherein said linear velocity is within a predetermined range of linear velocities.

6. A method as claimed in claim 5 wherein the linear velocity corresponding with the angular velocity at any point in the recording tracks of said second type portion is within said predetermined range of linear velocities.

7. A recording disc with recording tracks that have recorded thereon an information signal including a synchronizing signal, said disc comprising:

(a) a first area of recording tracks within a first circular zone of the recording disc, the information in said first area of recording tracks recorded on said disc while said disc is rotated at a constant angular velocity in which the synchronizing signals of the recording tracks are aligned in a radial direction of the recording disc;

(b) a second area of recording tracks within a second circular zone of the recording disc, the information in said second area of recording tracks recorded on said disc while said disc is rotated at a changing angular velocity;

(c) a third area of recording tracks within a third circular zone of the recording disc, the information in said third area recorded on said disc while said disc is rotated at a constant angular velocity so that corrresponding portions of the recording tracks at which the synchronizing signals are provided are aligned in a radial direction of the recording disc; and (d) said second area positioned between said first and said third areas.

8. A disc as claimed in claim 7 wherein said second area of recording tracks is recorded while said disc is rotated at a constant angular acceleration.

9. A disc as claimed in claim 7 wherein the linear velocity corresponding with the angular velocity at any point of the recording tracks that are formed in said first area does not exceed a predetermined maximum value.

10. A disc as claimed in claim 7 wherein said information signal is a video format signal and said synchronizing signal is a horizontal synchronizing signal.

11. A disc as claimed in claim 9 wherein said linear velocity is within a predetermined range of linear velocities.

12. A disc as claimed in claim 11 wherein the linear velocity corresponding with the angular velocity at any point in said second area of recording tracks is within said predetermined range of linear velocities.

* * * * *